US008828288B2

(12) United States Patent
Liao et al.

(10) Patent No.: US 8,828,288 B2
(45) Date of Patent: Sep. 9, 2014

(54) POROUS, LOW DENSITY NANOCLAY COMPOSITE

(75) Inventors: Qi Liao, Greer, SC (US); Walter A. Scrivens, Moore, SC (US); Philip T. Wilson, Duncan, SC (US); Darin L. Dotson, Moore, SC (US); Hao Zhou, Newburgh, IN (US)

(73) Assignee: Milliken & Company, Spartanburg, SC (US)

( * ) Notice: Subject to any disclaimer, the term of this patent is extended or adjusted under 35 U.S.C. 154(b) by 71 days.

(21) Appl. No.: 13/484,322

(22) Filed: May 31, 2012

(65) Prior Publication Data

US 2012/0309245 A1 Dec. 6, 2012

Related U.S. Application Data

(60) Provisional application No. 61/492,772, filed on Jun. 2, 2011.

(51) Int. Cl.
*B29C 35/16* (2006.01)

(52) U.S. Cl.
USPC .............................................. 264/28; 264/42

(58) Field of Classification Search
None
See application file for complete search history.

(56) References Cited

U.S. PATENT DOCUMENTS

| 5,214,012 | A | 5/1993 | Suzuki et al. |
| 6,228,501 | B1 | 5/2001 | Nakazawa et al. |
| 6,811,602 | B2 * | 11/2004 | Beppu et al. .................. 106/600 |
| 2007/0125700 | A1 * | 6/2007 | Ding et al. .................... 210/490 |
| 2007/0208124 | A1 * | 9/2007 | Schiraldi et al. .............. 524/445 |

FOREIGN PATENT DOCUMENTS

| DE | 195 04 899 A1 | 3/1996 |
| JP | 63159269 A | 7/1988 |
| JP | 11079860 A | 3/1999 |

OTHER PUBLICATIONS

PCT/US2012/040063 International Search Report, Nov. 26, 2012, 3 pages.
PCT/US2012/040063 Written Opinion of the International Searching Authority, Nov. 26, 2012, 4 pages.

* cited by examiner

*Primary Examiner* — Mary F Theisen
(74) *Attorney, Agent, or Firm* — Robert M. Lanning

(57) ABSTRACT

Disclosed are porous, low density nanoclay composites that exhibit highly homogeneous microcellular morphology and methods for forming the nanocomposites. The nanocomposites include a three-dimensional matrix having a non-lamellar, generally isotropic cellular structure with little or no macroscopic pores. The nanocomposites also include a gel that may be a noncovalently cross-linked, thermoreversible gel. The nanocomposites may include a binder and/or fibrous reinforcement materials. The nanocomposites may be formed according to a freeze-drying process in which ice crystal growth is controlled to prevent formation of macroscopic pores in the composite materials.

20 Claims, 12 Drawing Sheets

US 8,828,288 B2

POROUS, LOW DENSITY NANOCLAY COMPOSITE

CROSS REFERENCE TO RELATED APPLICATIONS

This application claims, pursuant to 35 U.S.C. §119(e), the benefit of the filing date of U.S. Patent Application No. 61/492,772, which was filed on Jun. 2, 2011 and is hereby incorporated by reference.

BACKGROUND

Low density porous materials useful in sound and/or thermal insulation applications, shock absorbing applications, and the like, have generally been low cost petroleum-based materials such as foamed styrols (polystyrenes). Unfortunately, these materials are primarily developed from non-renewable resources. In addition, they present multiple disposal problems. For example, polystyrenes are incinerated at high temperatures that may damage containment vessels and generate a large amount of $CO_2$. Furthermore, if such polystyrenes are not incinerated at extremely high temperatures, the process may generate polycyclic aromatic hydrocarbons (PAH). If such polystyrenes are not incinerated, they may remain intact as pollutants for an extremely long period of time.

In an attempt to provide alternatives to petroleum-based materials, composites have been developed that utilize more eco-friendly raw materials. For instance, inorganic materials such as silicas, clays, metal oxides and the like have been formed into aerogels. Clays have attracted a great deal of interest due to their abundance, environmental safety, and physical characteristics. Many such composite systems utilize layered or smectic clays that may be exfoliated into individual layers. For example, U.S. Patent Application Publication No. 2007/0208124 to Schiraldi, et al. describes a clay aerogel/polymer composite including exfoliated clay and polymers such as starches, plant gums, modified cellulosic and lignin materials, and the like.

Exfoliation of layered clays may be used to form nanoclays. Nanoclays are a broad class of inorganic minerals, of which plate-like montmorillonite is the most commonly used in materials applications. Montmorillonite consists of roughly 1 nanometer (nm) thick aluminosilicate layers surface-substituted with metal cations and stacked in about 10 micrometer (μm) thick multilayer stacks. The exfoliated layers may be dispersed in a polymer matrix to form a polymer-clay nanocomposite. Within the nanocomposite, individual clay layers form plate-like nanoparticles with a very high aspect ratio. Even at low nanoclay loading, the majority of the polymer chains may be held in close contact with a clay surface. This may dramatically alter properties of the nanocomposite as compared to an unfilled polymer matrix. For example, a nanoclay/polymer composite may exhibit increased mechanical strength, decreased gas permeability, superior flame-resistance, and even enhanced transparency as compared to an unfilled polymer matrix. For instance, U.S. Pat. No. 7,553,898 to Rafailovich, et al. describes a flame retardant plastic mixture that includes a polyolefin, a brominated polystyrene or decabromodiphenyl ether, a nanoclay, and metal oxide fillers.

Unfortunately, the potential of nanoclay composite materials has yet to be fully attained. This is understood to be primarily due to the tendency of clay nanoparticles to self-assemble into the relatively large, well-ordered lamellar structures found in nature. Nanocomposites formed to date tend to exhibit a lamellar structure including a large proportion of macroscopic porosity caused by the formation of these lamellar structures, which may prevent realization of desired composite characteristics.

What are needed in the art are composite materials and methods for forming the composites that provide favorable thermodynamic driving forces so as to overcome the tendency of nanoclay particles to assemble into lamellar structures. Such methods may be utilized to form eco-friendly, low density, fire-resistant composite materials that exhibit a homogeneous microscopic porous structure and desirable physical characteristics.

SUMMARY

According to one embodiment, disclosed is a method for forming a porous nanocomposite. For example, a method may include combining a purified nanoclay with a gelator and a liquid to form a mixture including the nanoclay dispersed in the liquid, e.g., water. Following combination, the gelator may be gelled. The gelled mixture may then be frozen and freeze-dried, which may remove the liquid from the porous nanocomposite.

Also disclosed are nanocomposites that may be formed according to the disclosed methods. For example, a nanocomposite may include a three-dimensional cellular network comprising nanoclay and a cross-linked gel. More specifically, cells of the cellular network may be three-dimensional microscopic sized cells having an aspect ratio from about 0.2 to about 5. The nanocomposite may be a noncovalently cross-linked, thermoreversible gel.

BRIEF DESCRIPTION OF THE FIGURES

A full and enabling disclosure of the subject matter, including the best mode thereof, directed to one of ordinary skill in the art, is set forth more particularly in the remainder of the specification, which makes reference to the appended figures in which.

DETAILED DESCRIPTION OF REPRESENTATIVE EMBODIMENTS

Figure 1:
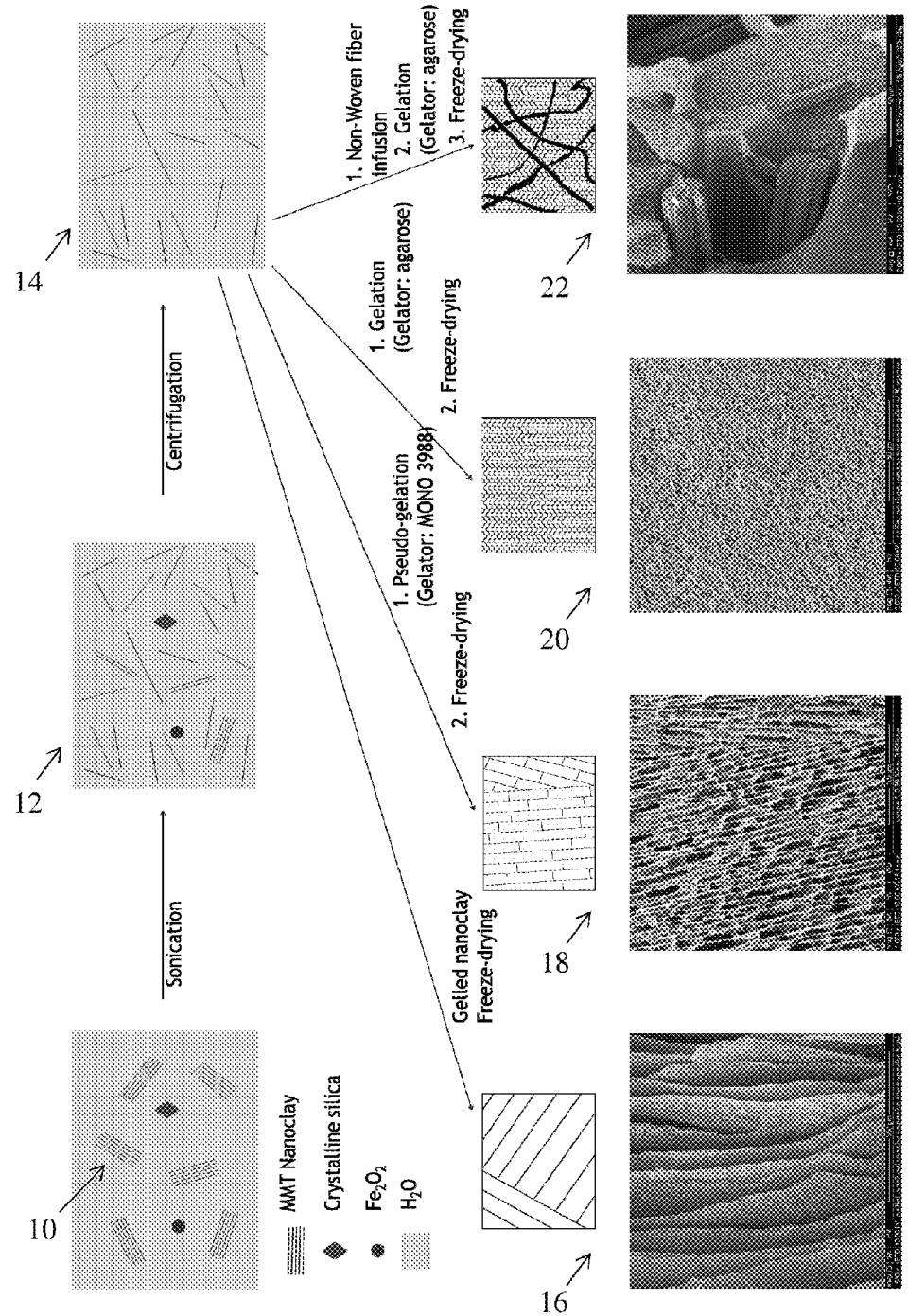
FIG. 1 illustrates the microporous structure of several different nanocomposites as described herein.

Reference now will be made in detail to various embodiments of the disclosed subject matter, one or more examples of which are set forth below. Each example is provided by way of explanation, not limitation. In fact, it will be apparent to those skilled in the art that modifications and variations may be made in the present disclosure without departing from the scope or spirit of the subject matter. For instance, features illustrated or described as part of one embodiment may be used on another embodiment to yield a still further embodiment. Thus, it is intended that the present disclosure covers such modifications and variations as come within the scope of the appended claims and their equivalents.

In general, the present disclosure is directed to nanoclay composites and methods of forming the composites. More specifically, the nanoclay composites are porous, low density materials that exhibit highly homogeneous microcellular morphology. Without wishing to be bound by any particular theory, it is believed that materials and processes used to form the composites provide thermodynamically beneficial driving forces to disrupt lamellar self-assembly of the nanoclay as well as to prevent agglomeration of the other components of the composite with the nanoclay. Accordingly, formed composites include a three-dimensional matrix having a non-lamellar, generally isotropic nanoclay structure with little or no macroscopic pores. More specifically, disclosed porous materials include a highly homogenous network of three-dimensional microscopic cells having dimensions in height and width that are much more isotropic than the lamellar structures of previously known composites. For instance, individual cells of a composite may have an aspect ratio from about 0.2 to about 5, from about 0.5 to about 4, or from about 1 to about 3. In contrast, previously known nanoclay composites include multiple lamellar sheets of the nanoclay that stack together or abut one another at an angle and include a large proportion of macroscopic porosity. The highly homogeneous microcellular morphology of the disclosed composites is understood to improve physical characteristics of the materials including both strength and insulating properties. As utilized herein the term "microscopic" generally refers to measurements from about 1 micrometer (μm) to about 900 μm, and the term "macroscopic" generally refers to measurements greater than about 900 μm.

As utilized herein, the term "clay" generally refers to a material that includes a hydrated silicate of an element such as aluminum, iron, magnesium, potassium, hydrated alumina, iron oxide, and so forth. Clays are phyllosilicates, characterized by two-dimensional sheets of corner-sharing tetrahedra and octahedra, for instance $SiO_4$ and $AlO_4$ tetrahedra and octahedra. Clays generally are formed in either a 1:1 or a 2:1 layer structure. A 1:1 clay includes one tetrahedral sheet and one octahedral sheet, examples of which include kaolinite and serpentinite. A 2:1 clay includes an octahedral sheet sandwiched between two tetrahedral sheets, examples of which include montmorillonite, illite, smectite, attapulgite, and chlorite (although chlorite has an external octahedral sheet often referred to as "brucite").

The silicate layers of clays are negatively charged, and are separated by layers of positively charged ions, such as sodium, potassium or other elements. Clays encompassed herein include naturally occurring clays as well as altered and synthetic clays. For example, altered clays in which sodium ions have been replaced with quaternary ammonium ions may be utilized. Examples of clays as may be utilized in forming a nanocomposite, include, but are not limited to, illite clays such as attapulgite, sepiolite, and allophone; smectite clays such as montmorillonite, bentonite, beidellite, nontronite, hectorite, saponite, and sauconite; kaolin clays such as kaolinite, dickite, nacrite, anauxite, and halloysite-endellite; and synthetic clays such as Laponite®, a synthetic aluminosilicate clay.

To form a nanocomposite, a clay (or a mixture of two or more different clays) may be dispersed in a liquid, generally water. FIG. 1 schematically illustrates a dispersed clay 10. The clay dispersion may generally include less than about 10 wt. % clay. For example, a clay dispersion may include from about 1 wt. % to about 5 wt. % clay, or from about 2 wt. % to about 4 wt. % clay, in another embodiment.

Following dispersion, the clay may be exfoliated to form nanoclay platelets. Sonication may be utilized to exfoliate the clay, according to standard practice. In general, sonication can be carried out for a period of time of greater than about 0.5 hours, for instance from about 1 hour to about 5 hours, so as to thoroughly exfoliate the clay. The method utilized to exfoliate the clay is not critical, however, and any method known in the art may be utilized. For instance, clay can be exfoliated through utilization of a high shear mixer. According to one such process, the clay dispersion can be mixed with a high shear mixer operating at greater than about 3000 RPM, or about 4000 RPM in one embodiment, for a period of a few minutes, e.g., from about 5 to about 10 minutes.

Any other method that may form an aqueous dispersion of nanoclay may alternatively be utilized to exfoliate the clay. By way of example, U.S. Pat. No. 7,785,492 to Jang, et al., which is incorporated herein by reference, describes a process for exfoliating a layered material that includes charging the layered material to an intercalation chamber comprising a gaseous environment at conditions that cause the gas species to penetrate into the interstitial space between layers of the layered material. Following gaseous intercalation, the layered material is rapidly ejected into an exfoliation zone, allowing the gas species to exfoliate the clay and form nanoclay platelets.

As schematically illustrated in FIG. 1, following exfoliation via, e.g., sonication, a dispersion 12 can include nanoclay platelets and few if any larger multilayer stacks. In general the nanoclay platelets may have a thickness of less than about 100 nanometers (nm), less than about 20 nm, less than about 10 nm, or less than about 5 nm as compared to multilayer stacks, which generally have a thickness on the micrometer scale, for instance greater than about 1 Ξm, or greater than about 5 μm.

In addition to exfoliation to form nanoclay, the clay may be purified. A purification step may be desirable because a clay (especially a natural clay) may contain impurities of other naturally occurring minerals, compounds, and elements that may vary depending on the location where the clay is obtained. These impurities often remain in the clay even after it has been "purified" by one or more of the known processes for "purifying" naturally occurring clay materials (e.g., the processes for preparing a commercially-available montmorillonite). While not wishing to be bound to any particular theory, it is believed that the presence of these impurities in the clay may, at least in part, deleteriously affect the ability of the clay particles to assume an arrangement or orientation in the gelled mixture necessary to yield the desired three-dimensional cellular network of the nanocomposite described herein. A purification process such as that described below may remove these impurities (e.g., crystalline silica, ferrous oxide, unexfoliated clay, or other impurities) yielding a high purity dispersion of the clay that can be used in forming the nanocomposite described herein. If a clay is provided in a purified state, for instance a synthetic clay such as Laponite®, a separate purification step may not be necessary.

A purification process can be a one-step or multi-step process, depending upon the nature of the impurities. For example, when purifying a natural clay, such as montmorillonite, in which impurities are denser than the nanoclay, a single-step separation process, such as centrifugation, may be carried out to purify the nanoclay dispersion. Centrifugation may be carried out batch-wise for a period of time, generally about 10 minutes or more, for instance from about 30 minutes to about two hours, or about one hour, in one embodiment. The speed of the centrifuge may vary, with higher speeds leading to higher purity dispersion. According to one embodiment, a centrifugation operation may be carried out at speeds greater than about 1000 RPM, for instance from about 2000 RPM to about 10000 RPM, or from about 4000 RPM to about 8000 RPM. The RPM values will vary depending upon the size and geometry of the centrifuge rotor. Consistent results between different centrifuges may be obtained by running at similar centripetal acceleration forces (e.g., similar relative centrifugal forces). According to one embodiment, the clay may be purified by centrifugation for any of the times mentioned above at a relative centrifugal force (RCF) of about 129 RCF or more, about 514 RCF or more, about 1,157 RCF or more, or about 2,057 RCF or more. For example, the clay may be purified by centrifugation at a relative centrifugal force of about 129 RCF to about 12,857 RCF, about 514 RCF to about 12,857 RCF, about 2,057 RCF to about 12,857 RCF, or about 2,057 RCF to about 8,228 RCF. The clay may also be purified via continuous centrifugation methods. Additionally, different centrifugation conditions may produce clay suspensions of different size distributions.

As illustrated in FIG. 1, following exfoliation and purification, a dispersion 14 can be a high purity nanoclay dispersion in which greater than about 98 wt. %, for instance greater than about 99 wt. %, of the solids contained in the dispersion may be nanoclay (i.e., clay particles having a thickness of about 100 nm or less). In other words, following the exfoliation and purification processes described above, the clay can be purified so that about 98 wt. % or more (e.g., about 99 wt. % or more) of the solids present in the dispersion 14 can be clay particles having a thickness of about 100 nm or less (e.g., about 90 nm or less, about 80 nm or less, about 70 nm or less, about 60 nm or less, about 50 nm or less, about 20 nm or less, about 10 nm or less, or about 5 nm or less). Thus, as noted above, the starting clay (e.g., a commercially-available montmorillonite) has been purified to remove substantially all of the impurities (e.g., crystalline silica, iron oxide, unexfoliated clay, etc.) present in the material prior to the purification. While not wishing to be bound to any particular theory, it is believed that such high purity nanoclay may be particularly suited to assuming an arrangement or orientation in the gelled mixture necessary to yield the desired three-dimensional cellular network of the nanocomposite described herein. The nanoclay dispersion can be a stable, colloidal system, generally including less than about 2 wt. % clay by weight of the aqueous dispersion. The low clay concentration in the dispersion can provide a stable colloidal system in which the nanoclay will remain in the dispersion without self-agglomeration.

To form the nanocomposite, one or more gelators can be combined with the purified nanoclay dispersion described above. As utilized herein the term "gelator" generally refers to a component that can form a gel. A gel being a system that does not flow, characterized by the presence of a plateau region of storage modulus and a low tan(delta) (e.g., less than about 0.1) at an angular frequency range from about $10^{-3}$ to about $10^2$ rad/s. Structurally, a gel is a system formed of molecules, particles, chains, etc., which are at least partially connected to each other by cross-links to macroscopic dimensions in a medium.

Gelators encompassed herein include polymers as well as small molecule gelators. A gelator may form a three-dimensional network, i.e., a gel, through physical aggregation of the gelator. Junction zones, or regions of local order of a gel may be formed by the aggregation of helices or stiff chains of the gelator or by liquid-liquid phase separation. In one preferred embodiment, the aggregation or phase change is due to hydrogen bonding. In one embodiment, the gel is thermoreversible, though this is not a requirement for a nanocomposite of the disclosure.

The gelator may form a gel in the nanoclay dispersion with little or no nanoclay agglomeration as lamellar structures, thereby preventing formation of macroscopic porosity in the formed nanocomposite. More specifically, the self-assembly (i.e., gelation) of the gelator may interfere with the natural, self-assembly of the nanoclay. As a result, the nanoclay will form a three-dimensional isotropic matrix in conjunction with the gel, with this three-dimensional matrix defining a microscopic porosity formed of three dimensional cells. The nanoclay may be encapsulated within the gel network or may be bound to the gel network, for instance as a component of the network structure, depending upon the specific materials used in forming the composite. In either case, however, the nanoclay will substantially maintain the desired nanostructures, rather than agglomerating to form lamellar structures within the composite. For example, in one embodiment, the formed nanocomposite may include few or no clay particles in the form of multilayer stacks, i.e., clay particles having a thickness greater than about 1 micrometer. For example, greater than about 99%, greater than about 98%, or greater than about 95%, by number, of the clay of the nanocomposite may be in the form of nanoclay, having a thickness of less than about 100 nanometers, rather than clay particles in multilayer stack conformation.

Gelators encompassed herein may form a gel at relatively low concentrations. For example, an aqueous nanoclay dispersion can include less than about 5 wt. % gelator, less than about 2 wt. % gelator, or less than about 1 wt. % gelator, and more than about 0.05 wt. % gelator, more than about 0.1 wt. % gelator, or more than about 0.2 wt. %. Accordingly, the formed nanocomposites can include a relatively large proportion of nanoclays as compared to previously known systems that utilize a gelator that requires a higher concentration in order to form the desired three-dimensional network.

In one preferred embodiment, the gelator can be an agarose, which encompasses the polysaccharide agarose as well as derivatives thereof. Agarose is a linear polymer formed of repeating monomeric units of agarobiose, which is a disaccharide formed of D-galactose and 3,6-anhydro-L-galactopyranose. Agarose forms a thermoreversible gel through formation of hydrogen bonds that cross-link the polymer network. Agarose may be added to a purified nanoclay dispersion in an amount of less than about 2 wt. % and more than about 0.1 wt. % of the dispersion, for instance about 1 wt. %, and may spontaneously gel upon cooling from a temperature above the melt temperature of the agarose (about 85° C.).

In general, the gelator may be any material that may form a gel in the presence of nanoclay under similar thermodynamic principles as an agarose/nanoclay dispersion, i.e., a thermoreversible gel may form from a dispersion including the gelator at a concentration of less than about 5 wt. % and more than about 0.2 wt. % and will include the nanoclay in a well-dispersed, isotropic matrix with little or no agglomeration of the nanoclay, either with itself or with the gelator. In addition to agarose, other gelators that form a gel in the presence of nanoclay include carrageenan, gelatin, methyl cellulose and other modified cellulose gelators, and gellan gum, as well as combinations thereof.

In one embodiment, the gelator may be a small molecule gelator having number average a molecular weight less than about 3000. Self-assembled three-dimensional networks may be formed by interconnecting the small molecule gelator through noncovalent interaction, generally hydrogen bonding. Noncovalent cross-links of a gel may alternatively be formed via other interaction, however, including Van der Waals forces, $\pi$-$\pi$ interactions, and ionic bonding. In this embodiment, the formed gel may be thermoreversible.

Small molecule gelators encompassed herein include, without limitation, dibenzylidene sorbitol gelators and derivatives thereof, examples of which have been described in U.S. Pat. No. 4,154,816 to Roehl et al., U.S. Pat. No. 4,816,261 to Luebbe et al., U.S. Pat. No. 4,743,444 to McCall, U.S. Pat. No. 5,609,855 to Oh et al., U.S. Pat. No. 6,121,332 to Dotson, et al., U.S. Pat. No. 6,844,382 to Dotson, et al., U.S. Pat. No. 6,716,439 to Anderson, et al., and U.S. Pat. No. 7,888,454 to Xie, all of which are incorporated herein by reference. In one preferred embodiment, the gelator may be the small molecule gelator 2,3(2,4-O-(3,4-dimethylbenzylidene)-D-sorbitol) (3,4-DMMBS), available from Milliken Chemical. In another preferred embodiment, the gelator may be 2,3(2,4-O-(3,4-dichlorobenzylidene)-D-sorbitol) (3,4-DCMBS), available from Milliken Chemical.

Other small molecule gelators include, without limitation, fatty acid derivatives, steroid derivatives such as D-3$\beta$-hydroxy-17,17-dipropyl-17a-azahomoandrostanyl-17a-oxy (STNO) and D-3$\beta$-hydroxy-17,17-dipropyl-17a-azahomoandrostanyl-17a-aza (STHN), gelling agents containing steroidal and condensed aromatic rings, such as anthryl and anthraquinone appended steroid-based gelling agents, for example 2,3-bis-n-decyloxyanthracene (DDOA) and 2,3-bis-n-decyloxyanthraquinone (DDOA), azobenzene steroid-based gelling agents, such as molecules having a highly polar azobenzene group linked at C3 of a steroidal moiety, amino acid-type SMGAs such as dibenzoyl cystine, and organometallic compounds, such as mononuclear copper $\beta$-diketonates.

In one embodiment, two or more gelling agents can be used in combination. Specific examples of the above classes of compounds and other gelling agents are known in the art and have been described, for example, in "Low Molecular Mass Gelators of Organic Liquids and the Properties of Their Gels," by Pierre Terech and Richard G. Weiss (Chem. Rev. 1997, 97, 3133-3159), and in "Organogels and Low Molecular Mass Organic Gelators," by David J. Abdallah and Richard G. Weiss (Adv. Matter. 2000, 12, No. 17, 1237-1247).

The preferred method for gelling the gelator can generally depend upon the specific materials included in the nanoclay/gelator mixture. For example, when considering an agarose gelator, the mixture can be heated to a temperature above the melting point of the agarose, and then cooled to a gelling temperature, at which point the gelator can spontaneously self-assemble to form the gel. Specific conditions for the formation of a particular gel may vary depending upon the gelator and any additives included in the mixture, but are well within the knowledge and abilities of one of ordinary skill in the art.

Following formation of the gel, the water may be removed from the nanocomposite by freezing followed by freeze-drying. In one preferred embodiment, the gel freezing process may be carried out so that any ice crystals that form exhibit a size approximately equal to or smaller than the nanoclay. Growth of ice crystals during the freezing process can be controlled by design of the freezing process, through utilization of an ice crystal inhibitor, or both.

A quick freezing process can be utilized to inhibit ice crystal growth. For example, ice crystal size may be controlled by the freezing velocity, with a small crystal size formed when freezing is carried out in a short time period, for instance, less than one minute, or from about ten seconds to about thirty seconds. By utilizing a short freezing time, ice crystals have little time to grow, and a great quantity of small size crystals are obtained, homogeneously distributed in the inter- and intra-cellular space of the nanocomposite.

To achieve short freezing times, cryogenic methods may be used as are generally known in the art. For example, the composite gel may pass through a shower or spray of liquid nitrogen or liquid carbonic anhydride, where it is quickly frozen.

In conjunction with or alternative to a cryogenic freezing process, the nanoclay/gelator mixture may include an ice crystal inhibitor, which is a component that inhibits the growth of ice crystals during the freezing process. Any ice crystal inhibitor known in the art may be incorporated in a mixture. For example, a number of ice crystal inhibitors are known in food and biological processing, all of which are encompassed herein. By way of example, U.S. Pat. No. 5,175,013 to Huang, et al. discloses a high molecular weight starch hydrolysate that may be used to control growth of ice crystals during a freezing process; U.S. Pat. No. 5,324,751 to DuRoss discloses microcrystals of sorbitol and mannitol that may serve as an ice crystal inhibitor; and U.S. Pat. No. 5,118,792 to Warren, et al. describes a polypeptide ice crystal inhibitor; all of which are incorporated herein by reference. Other ice crystal inhibitors known in the art can be utilized including, without limitation, linear polymers of glycerol, dimethylsulfoxide, methanol, ethanol, isopropanol, ethylene glycol, polyethylene glycol, glycerin, 1,2-propanediol, urea, sugar (e.g., sucrose, raffinose), aminoacetic acid, oxalic acid, polyvinyl alcohol, methylcellulose, ethylcellulose, polyvinylpyrrolidone, and the like, and combinations thereof. When included in the nanoclay/gelator mixture, an ice crystal inhibitor can generally be present in a relatively low concentration, for instance less than about 5 wt. % of the aqueous mixture and more than about 0.1 wt. % of the aqueous mixture, or about 1 wt. % in one embodiment.

A nanoclay/gelator mixture may include a binder additive that may provide additional strength and/or water/solvent resistance to the nanocomposite product. In general, binders as are encompassed herein include compounds that are soluble in the nanoclay/gelator mixture and that may be cured to form a non-soluble, cross-linked network following removal of the liquid from the formed nanocomposite.

Binders may include monomeric or oligomeric prepolymers that may be cross-linked following the freezing and freeze-drying processes to form a cross-linked network in the formed nanocomposite. The cross-linked network including the binder may chemically interact with other components of the nanocomposite, e.g., the nanoclay, the gel and/or the freezing aid, or may cross-link independently of the other components.

According to one embodiment, a binder may include a poly-functional molecule comprising at least two functional groups such as carboxyl, anhydride and/or amine; and a cross-linking agent present in amounts effective to cross-link the poly-functional molecule. For example, the cross-linking agent may include a single urea group and at least two hydroxyl groups, and at least two carbon atoms may be disposed between the urea group and each of the hydroxyl groups.

A binder may be a heat cured binder, such as known resinous phenolic materials, examples of which include phenol-formaldehyde resins or phenol urea formaldehyde (PUFA). Melamine formaldehyde, acrylic, polyester, nylon, urethane, polyimides, and furan binders are other examples of binders that may be included in a mixture. Binders may be organic or inorganic binders. For example, an alumina sol, a titania sol, a water glass (i.e., a sodium metasilicate) or the like may be included in the mixture as an inorganic binder.

A binder may be curable by use of any suitable method including microwave, UV, or any suitable energy source. For example, UV curable binders have been described in U.S. Pat. No. 5,275,874 to Brandenburg, et al., which is incorporated herein by reference. UV curable binders may include reactive oligomers, e.g., acrylated epoxies, acrylated urethanes, acrylated polyesters, acrylated silicones, multifunctional acrylate and methacrylate monomers, unsaturated polyesters and acrylics, optionally in conjunction with one or more photoinitiators. Photoinitiators as are generally known in the art may be utilized, for instance as described in U.S. Pat. No. 5,146,531 to Shustack, U.S. Pat. No. 5,336,563 to Coady, et al., and U.S. Pat. No. 6,323,255 to Snowwhite, all of which are incorporated herein by reference.

When present, a binder, including any cross-linking agents, photoinitiators, etc., may be incorporated in a nanoclay/gelator mixture in an amount of more than about 0.1 wt. % and less than about 10 wt. % by weight of the mixture, for instance less than about 5 wt. % by weight of the mixture, or less than about 2 wt. % by weight of the mixture.

In order to further strengthen a formed nanocomposite, a fibrous additive may be included. A fibrous additive may be in the form of individual fibers or a fabric, e.g., a woven, non-woven, or knit fabric.

A wide variety of natural and synthetic fibers is suitable for use in a nanocomposite.

Synthetic fibers suitable for use include fibers formed of cellulose acetate, polyolefins (including polyethylene and polypropylene), polyamide, aramid, polyester (including polyethylene terephthalate (PET)), vinyl chloride, regenerated cellulose such as viscose rayon, carbon fibers, glass fibers, ceramic fibers, basalt or other mineral fibers, bicomponent fibers, and the like.

Other suitable synthetic fibers include fibers made from various polymers including, by way of example and not by limitation, acrylic, polyamides (such as, for example, Nylon 6, Nylon 6/6, Nylon 12, polyaspartic acid, polyglutamic acid, and so forth), polyamines, polyimides, polyacrylics (such as, for example, polyacrylamide, polyacrylonitrile, esters of methacrylic acid and acrylic acid, and so forth), polycarbonates (such as, for example, polybisphenol A carbonate, polypropylene carbonate, and so forth), polydienes (such as, for example, polybutadiene, polyisoprene, polynorbornene, and so forth), polyepoxides, polytrimethylene terephthalate, polycaprolactone, polyglycolide, polylactide, polyhydroxybutyrate, polyhydroxyvalerate, polyethylene adipate, polybutylene adipate, polypropylene succinate, polyethers (such as, for example, polyethylene glycol (polyethylene oxide), polybutylene glycol, polypropylene oxide, polyoxymethylene (paraformaldehyde), polytetramethylene ether (polytetrahydrofuran), polyepichlorohydrin, and so forth), polyfluorocarbons, formaldehyde polymers, natural polymers (such as, for example, cellulosics, chitosans, lignins, waxes, and so forth), polyphenylenes (such as, for example, polyphenylene oxide, polyphenylene sulfide, polyphenylene ether sulfone, and so forth), silicon containing polymers (such as, for example, polydimethyl siloxane, polycarbomethyl silane, and so forth), polyurethanes, polyvinyls (such as, for example, polyvinyl butyral, polyvinyl alcohol, esters and ethers of polyvinyl alcohol, polyvinyl acetate, polystyrene, polymethylstyrene, polyvinyl pryrrolidone, polymethyl vinyl ether, polyethyl vinyl ether, polyvinyl methyl ketone, and so forth), polyacetals, polyarylates, and copolymers (such as, for example, polyethylene-co-vinyl acetate, polyethylene-co-acrylic acid, polybutylene terephthalate-co-polyethylene terephthalate, polylauryllactam-block-polytetrahydrofuran, and so forth).

Cellulosic fibrous materials suitable for use include both softwood fibers and hardwood fibers. Cellulose fibers may be derived form other sources including, without limitation, Esparto grass, bagasse, jute, ramie, kenaf, sisal, abaca, hemp, flax and other lignaceous and cellulosic fiber sources. Also available are cotton linter pulp, and chemically modified cellulose. Cross-linked cellulose fibers, also known in the industry as curly fibers, may be utilized, for instance when it is desired to achieve high performance composite materials. Cross-linked fibers are described in U.S. Pat. No. 4,898,462 to Numata, et al.; U.S. Pat. No. 4,889,595 to Heron, et al.; U.S. Pat. No. 4,888,093 to Dean, et al.; U.S. Pat. No. 4,822,453 to Dean, et al., all of which are hereby incorporated by reference in their entirety. Recycled cellulose fibers from cardboard and newsprint are further sources.

In one embodiment, a fibrous reinforcement material may be included in a nanocomposite that is a high loft material, for instance a spacer fabric, e.g., a three-dimensional, high loft warp knit spacer fabric. A spacer fabric may provide a high compressive force resistance and high longitudinal and transverse load-bearing capacity to a composite. Any spacer fabric as is generally known in the art may be incorporated in a composite. By way of example, U.S. Pat. No. 7,718,249 to Russell, et al. describes a non-woven spacer fabric that has at least two separate but interconnected layers, each layer including discrete connection so as to provide voids between the two layers; U.S. Pat. No. 5,906,879 to Huntoon, et al. describes a 3D thermal-bonded nonwoven fabric made of a bulky layer comprising a highly crimped conjugated bi-component fiber with a plurality of peaks separated by channels; U.S. Pat. No. 5,475,904 to Le Roy describes a method for producing 3D structures by joining two or three fibrous materials together with a space or void left between the basic layers, the layers of fibrous materials can be woven, knitted, nonwoven or a combination of these and filling materials can be introduced between the two basic layers; all of which are incorporated herein by reference.

When present, fibrous reinforcement materials may be present in the formed composite in an amount of from about 10 wt. % to about 95 wt. % based on the solids weight of the formed material. For instance, a composite may include fibrous materials in an amount of from about 40 wt. % to about 90 wt. % or from about 60 wt. % to about 80 wt. %, based upon the solids weight of the formed composite.

The fibers may be added to the mixture during a mixing process, for instance when utilizing individual fibers, or alternatively, the mixture may be incorporated into and around the fibers, for instance when the fibrous reinforcement is provided as a woven, knit, or nonwoven fabric material. For example, the mixture may be poured over or otherwise associated with a fibrous reinforcement material and the mixture may penetrate within the material prior to gellation.

As previously discussed, following formation of the mixture, including the nanoclay, gelator, liquid, and any desired additives, the gel may be formed and the liquid, e.g., the water, of the mixture may be removed according to a freeze-drying process. Specifically, the mixture is first frozen according to a process that inhibits ice crystal growth, and then the liquid is removed from the frozen mixture. Drying can be carried out by placing the frozen mixture under a vacuum of, e.g., below about 2 Torr (270 Pa), thus causing the liquid contained in the mixture to sublimate.

In those embodiments in which a binder is present in the composite, additional steps may be carried out, if necessary, to cross-link the binder following the removal of the liquid from the material. For instance, the composite may be subjected to an energy source, e.g., heat, microwave, UV, etc., to instigate cross-linking of the binder. In other embodiments, an additional step may not be necessary, as the binder may spontaneously cross-link during formation, for instance during or following the freeze-drying process.

Formed composites can exhibit excellent characteristics for a variety of applications. For instance, and with reference to FIG. 1, comparison can be seen between several formed materials. At 16 is illustrated a material formed from a purified nanoclay dispersion, with no gelator included in the mixture. The dispersion is freeze-dried to remove the water from the mixture, leaving the illustrated clay matrix. As can be seen the material as formed is a porous matrix, but the porosity is heterogeneous and includes macroscopic pores between the large lamellar sheets formed of the agglomerated clay layers. The nanocomposite 18 is a freeze-dried product formed from a purified nanoclay dispersion that included in the mixture a small molecule gelator, specifically, a 3,4-DM-MBS gelator. As can be seen, the porous structure of the nanocomposite is much more homogeneous, and includes primarily microscopic pores. The nanocomposite 20 is a freeze-dried product formed from a purified nanoclay dispersion that included an agarose gelator. The nanocomposite exhibits a homogeneous porosity, with microscopic pores having a smaller pore size as compared to the nanocomposite formed with a small molecule gelator. As can be seen, the micro- and nano-scale porous structure of a composite may be altered and refined through selection of the gelator. The nanocomposite 22 is similar to nanocomposite 20, but includes an infusion of non-woven fibers in the material. The fiber does not alter the microscopic porosity of the composite, while providing additional structural integrity to the composite.

The present disclosure may be better understood with reference to the Examples, below.

Example 1

3 wt. % Montmorillonite was mixed in deionized water with stirring in a glass jar. The mixture was placed in a 1000 watt ultrasonic cleaning bath for 1 hr to obtain a crude nanoclay dispersion. Following sonication, the mixture was centrifuged for 60 min. Mixtures were centrifuged at several different speeds, following which the solids concentration remaining in the dispersion was determined. Results are provided in Table 1, below:

TABLE 1

| | Centrifugation Speed (RPM) | | | | | | | | | | |
|---|---|---|---|---|---|---|---|---|---|---|---|
| | 0 | 1000 | 2000 | 3000 | 4000 | 5000 | 6000 | 7000 | 8000 | 9000 | 1000 |
| Relative Centrifugal Force (RCF) | 0 | 129 | 514 | 1157 | 2057 | 3214 | 4629 | 6300 | 8228 | 10414 | 12857 |
| Solids Concentration (wt. %) | 2.23 | 1.79 | 1.61 | 1.28 | 1.25 | 1.22 | 1.15 | 1.13 | 1.07 | 1.02 | 0.99 |

Laponite ® (available from Southern Clay Products) was blended at 1:100 mass ratio with deionized water. After ultrasonication for 30 min, the Laponite ®hydrated and swelled to give a stable, translucent and colorless colloidal dispersion.

Example 2

Agarose powder was added to an exfoliated and purified nanoclay dispersion as described in Example 1. Specifically, the dispersion was purified at 7000 RPM for one hour and the agarose was added to the dispersion in an amount of 1.0 wt. % by weight of the dispersion. Following, the mixture was heated in an autoclave at a temperature of 121° C. for 30 min. The mixture was then cooled to room temperature, during which a solid gel was formed. The gel was then frozen in liquid nitrogen into a solid and then freeze-dried under 10 mTorr (1.3 Pa) vacuum for 72 hours.

Figure 2A:
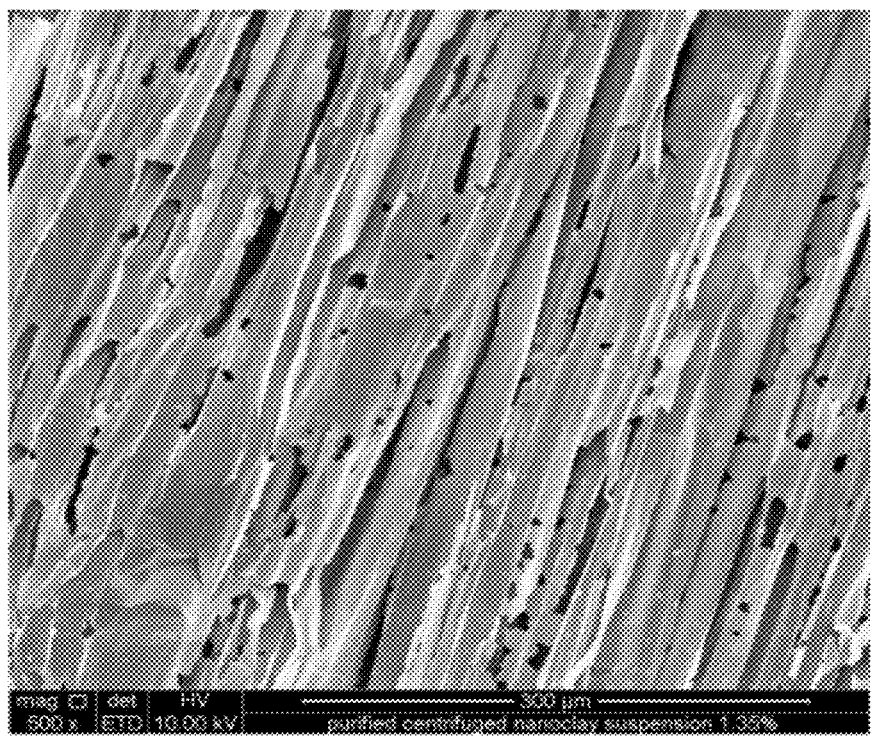
FIG. 2A is a scanning electron microscopy (SEM) image of a cryo-fractured cross-section of a freeze-dried purified nanoclay dispersion.
Figure 2B:
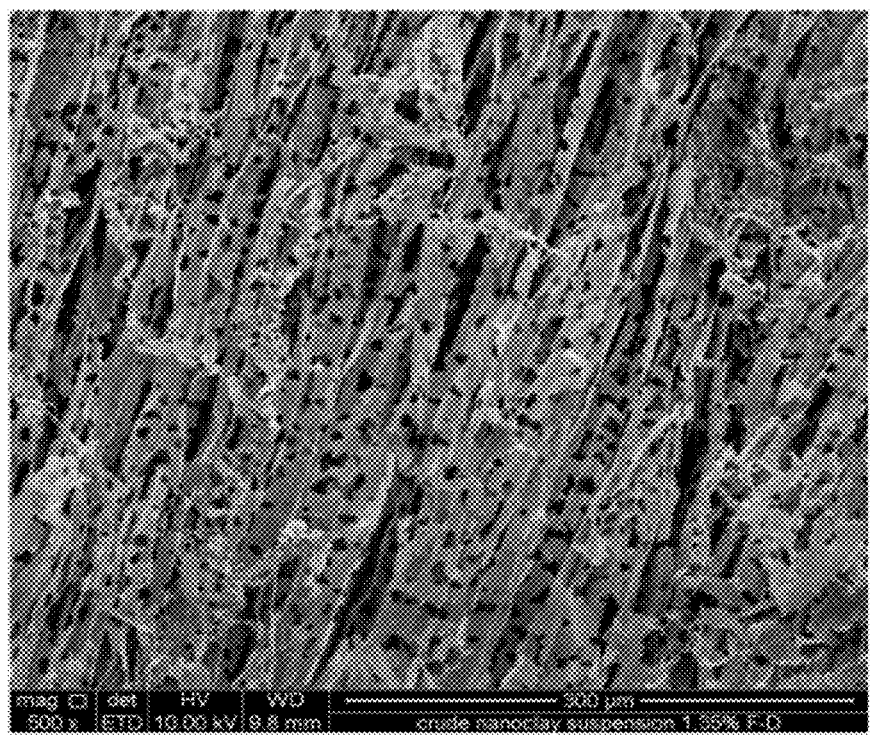
FIG. 2B is an SEM image of a cryo-fractured cross-section of a freeze-dried crude nanoclay dispersion.
Figure 2C:
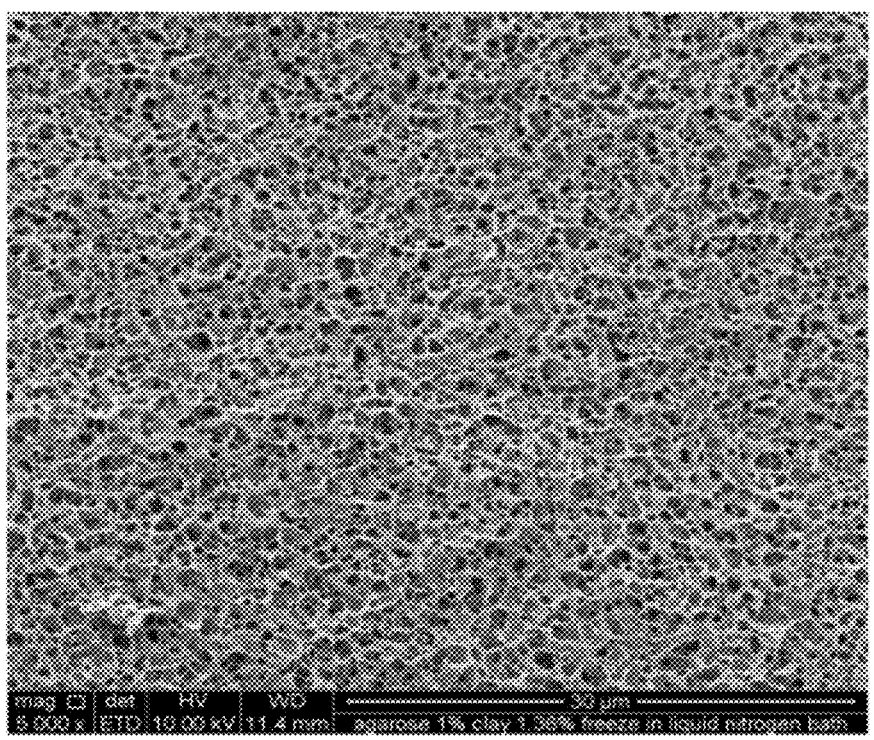
FIG. 2C is an SEM image of a cryo-fractured cross-section of a freeze-dried purified nanoclay/agarose gel.

For comparison, a purified and exfoliated nanoclay dispersion was freeze-dried, with no gelator in the mixture, as was a crude nanoclay dispersion (no purification step). FIG. 2A is an SEM image of the purified, exfoliated nanoclay dispersion product, FIG. 2B is an SEM image of the crude dispersion product, and FIG. 2C is an SEM image of the gel product. As can be seen merely purifying the dispersion leads to improved uniformity and fewer defects in the product, and addition of the gelator results in a homogeneous nano/microcellular morphology.

Example 3

Figure 3:
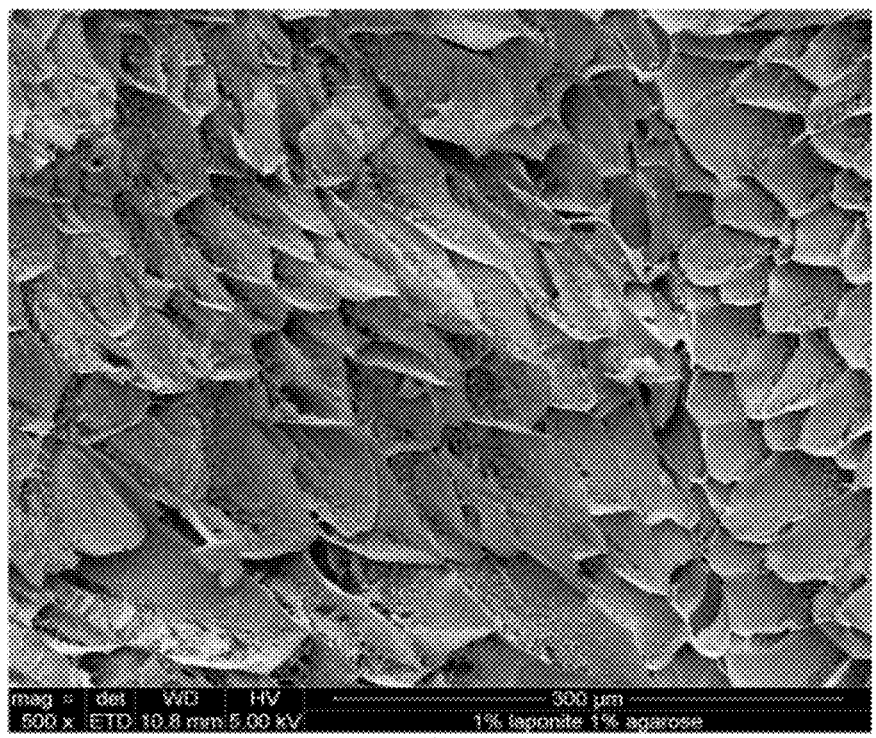
FIG. 3 is an SEM image of a cryo-fractured cross section of a freeze-dried Laponite®/agarose gel.

1 wt. % Laponite® dispersion as described above was formed. 1 wt. % agarose powder was added to this dispersion. The mixture was stirred and then autoclaved at 121° C. for 30 min. The mixture of Laponite® and agarose was a transparent and brownish yellow color liquid when still hot. Gelation occurred as the temperature decreased and a uniform, translucent gel was formed. The gel was frozen uniformly in a −20° C. glycerol/water bath, followed by freeze-drying under 10 mTorr (1.3 Pa) vacuum for 72 hours. FIG. 3 is an SEM image of a cryo-fractured cross-section of the formed composite. As can be seen, the gel shows a homogeneous microcellular morphology.

Example 4

Figure 4:
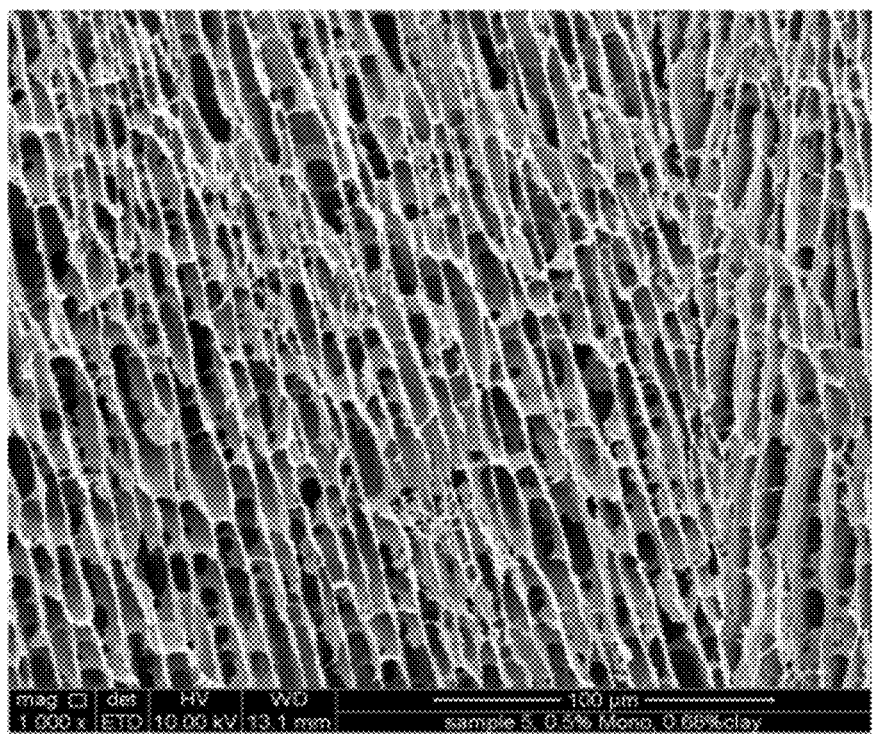
FIG. 4 is an SEM image of a cryo-fractured cross section of a freeze-dried purified nanoclay/functionalized sorbitol gel.

1 wt. % 2,3(2,4-O-(3,4-dimethylbenzylidene)-D-sorbitol) 3,4-DMMBS, available from Milliken Chemical) was mixed with deionized water. The mixture was heating to boiling and stirred to dissolve the 3,4-DMMBS completely. Following, the mixture was filtered. This formed solution, while still hot, was blended with a purified nanoclay dispersion formed as described above at a 1:1 volume ratio. The mixture was then allowed to cool to room temperature, where it formed a soft gel. The gel was frozen in liquid nitrogen, and then freeze-dried under 10 mTorr (1.3 Pa) vacuum for 72 hours. FIG. 4 is an SEM image of the cryo-fractured cross-section of the product composite. As can be seen, the gel shows a microcellular morphology.

Example 5

Polyvinyl alcohol (PVA) powder was dissolved at 10 wt. % in deionized water by heating until the liquid started to slightly boil, which resulted in a clear and viscous solution. In a second container, agarose powder was added at 1 wt. % to a purified and exfoliated nanoclay dispersion formed as described above. The mixture was stirred then autoclaved to 121° C. for 30 minutes until the agarose was fully dissolved. The agarose/nanoclay mixture was cooled to slightly above the gelation temperature of agarose and then the PVA solution was added to make the final PVA concentration in the mixture 1 wt. %. As the temperature decreased, this mixture formed a translucent gel. The gel was frozen in a −20° C. glycol/water bath and a white, solid ice was obtained. The material was then freeze-dried under 10 mTorr (1.3 Pa) vacuum for 72 hours to obtain a porous composite.

Figure 5A:
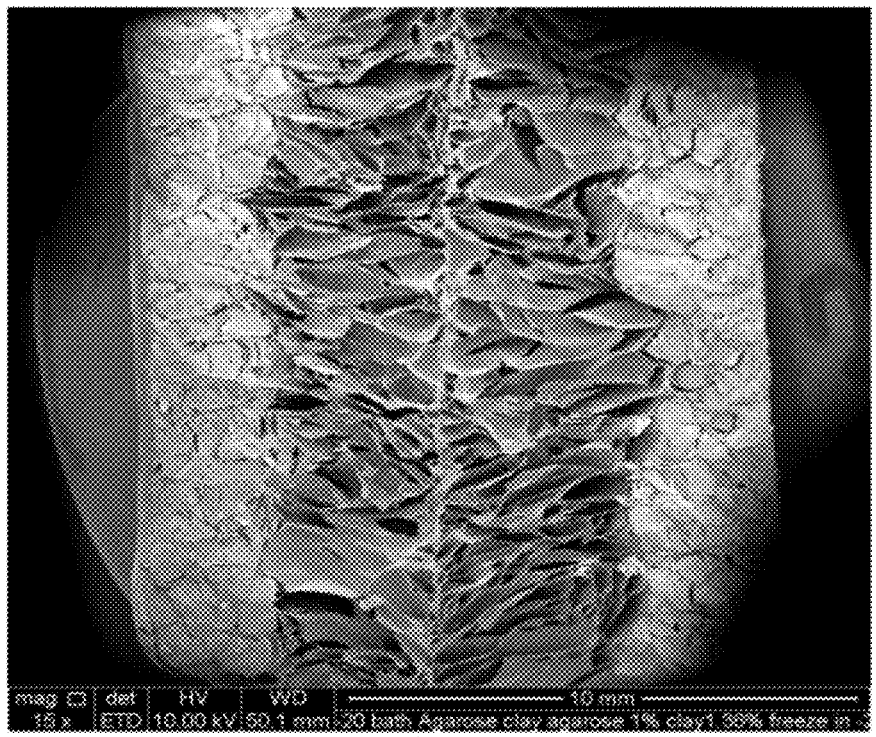
FIG. 5A is an SEM image of a cryo-fractured cross section of a purified nanoclay/agarose gel frozen in −20° C. glycol/water bath at 15× magnification.
Figure 5B:
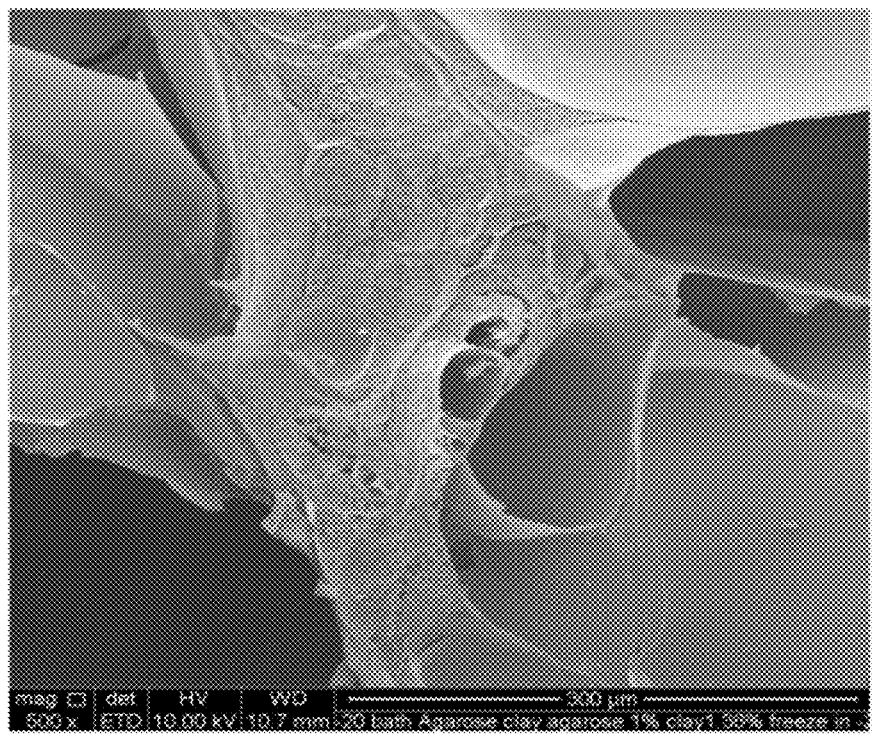
FIG. 5B is the gel of FIG. 5A at 500× magnification.
Figure 6A:
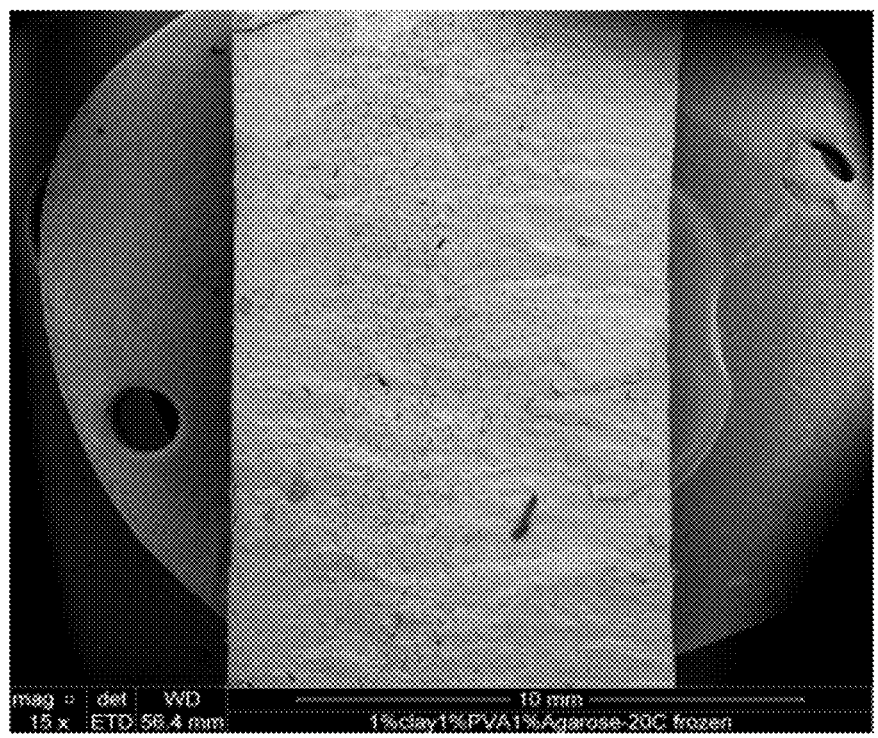
FIG. 6A is an SEM image of a cryo-fractured cross section of a purified nanoclay/agarose/polyvinyl alcohol (PVA) gel frozen in −20° C. glycol/water bath at 15× magnification.
Figure 6B:
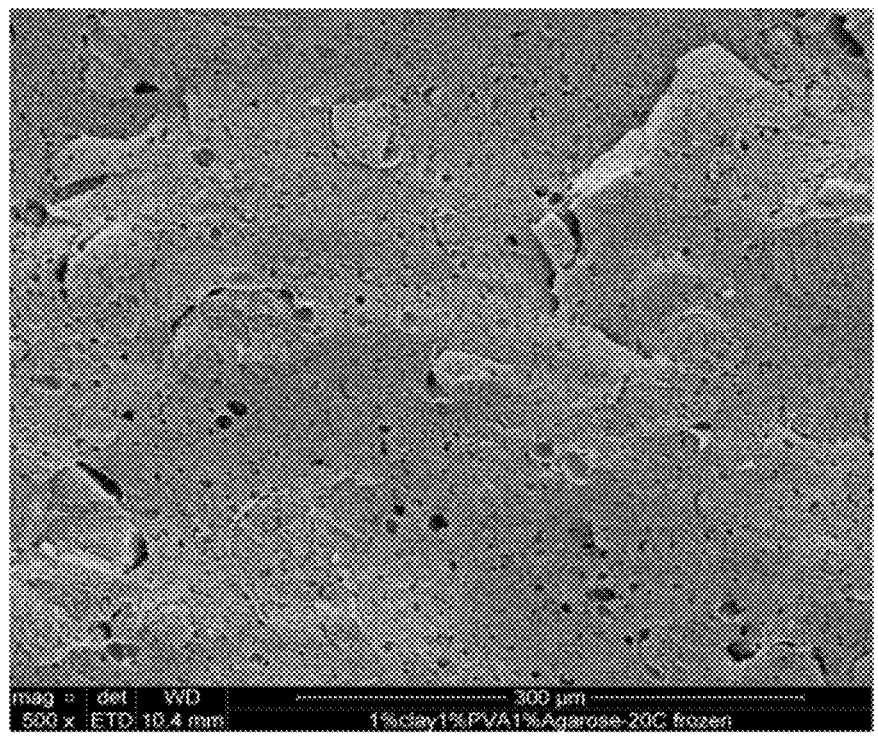
FIG. 6B is the gel of FIG. 6A at 500× magnification.

FIGS. 5A and 5B illustrate SEM images of a gel formed without the PVA ice inhibitor at 15× and 500× magnification. Freezing artifacts may be seen where larger ice crystals disrupted the microcellular morphology. FIGS. 6A and 6B illustrate SEM images of the gel formed including the PVA ice inhibitor at 15× and 500× magnification. The gel had uniform cellular structure with no disruption of the microcellular morphology.

Example 6

Figure 7:
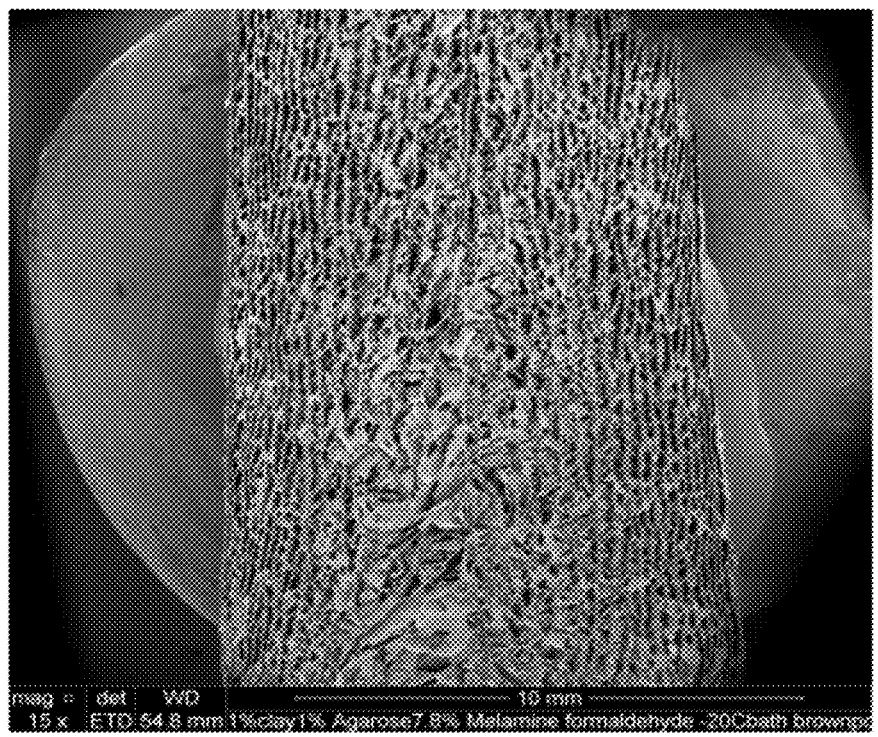
FIG. 7 is an SEM image of a cryo-fractured cross section of a freeze-dried purified nanoclay/agarose/melamine formaldehyde gel frozen in −20° C. glycol/water bath.

1 wt. % triglycerol (Aldrich) was combined with a purified, exfoliated nanoclay dispersion as described above at room temperature with extensive stirring. When the triglycerol was fully dissolved, agarose powder at 1 wt. % was added to the mixture. The mixture was stirred and autoclaved at 121° C. for 30 minutes until the agarose was fully dissolved. The agarose/triglycerol/nanoclay mixture was cooled to room temperature and spontaneously formed a translucent gel. The gel was frozen in a −20° C. glycol/water bath to provide a glassy and semi-transparent solid. This material was then freeze-dried under 10 mTorr (1.3 Pa) vacuum for 72 hours to obtain a highly porous structure. FIG. 7 is an SEM image of the product formed. As can be seen, the composite exhibited excellent uniformity of the microstructure.

Example 7

A melamine formaldehyde concentrated solution (CYMEL resin) was mixed with a purified and exfoliated nanoclay dispersion as described above to obtain a mixture that included 1.0 wt. % melamine formaldehyde, 1.5 wt. % nanoclay and 97.5 wt. % deionized water. The mixture was then frozen in a −20° C. glycol/water bath, and freeze dried under 10 mTorr (1.3 Pa) vacuum for 72 hours. The product exhibited good hydrophobicity and high temperature stability.

Example 8

Agarose powder at 0.5 wt. % was dissolved and mixed with an exfoliated and purified nanoclay dispersion as described above. Following, the mixture was autoclaved at a temperature of 121° C. for 30 minutes. The mixture was cooled down to slightly above the gelling temperature of agarose a melamine formaldehyde concentrated solution was added while stirring such that the mixture included 7.8 wt. % of melamine formaldehyde. The gel was then frozen in a −20° C. glycol/water bath, and then was freeze-dried under 10 mTorr (1.3 Pa) vacuum for 72 hours.

Figure 8A:
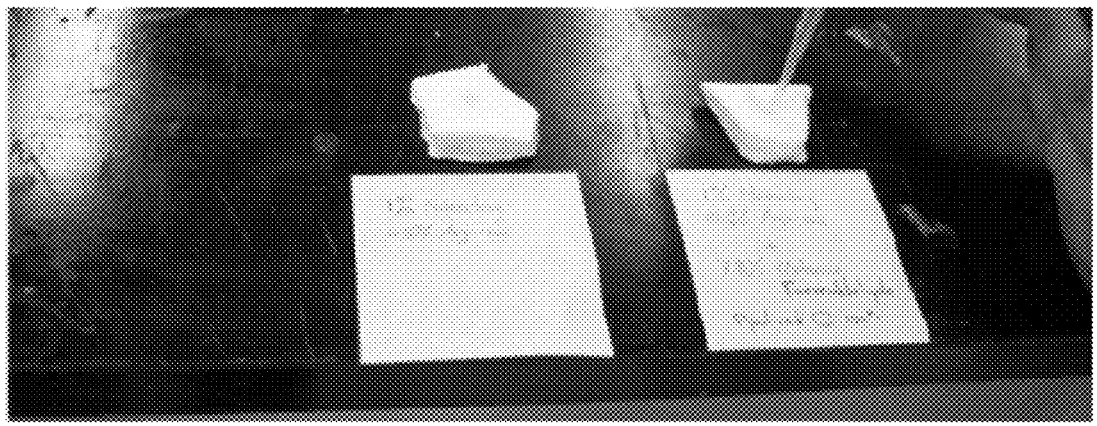
FIG. 8A illustrates the addition of water on to two nanoclay composites, one of which includes cured melamine formaldehyde in the composite.
Figure 8B:
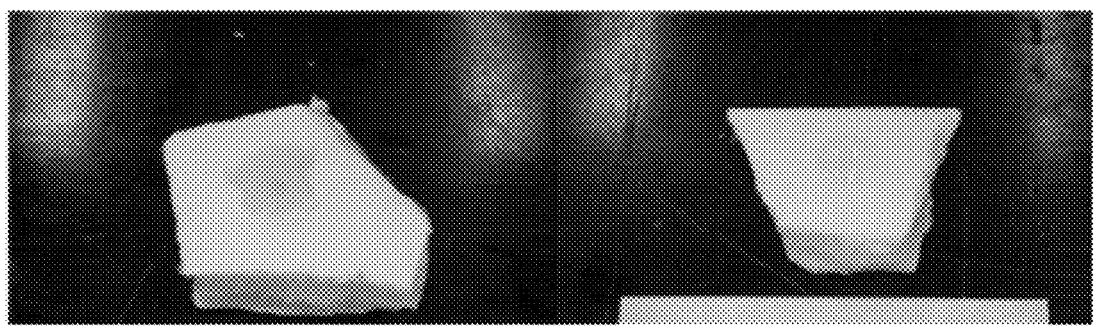
FIG. 8B illustrates the two samples of FIG. 8A 30 seconds following water addition.
Figure 8C:
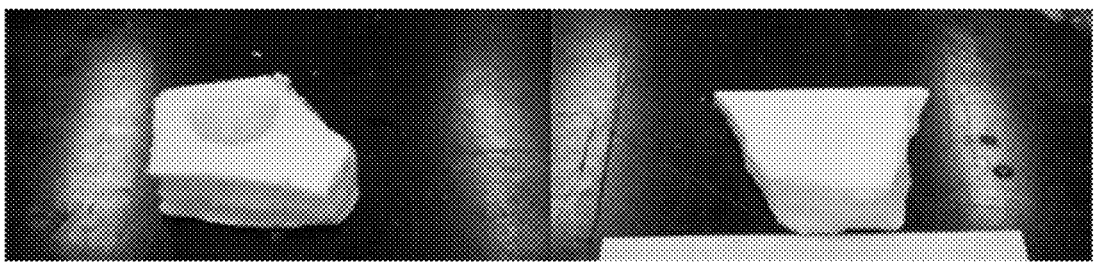
FIG. 8C illustrates the two samples of FIG. 8A one hour following water addition.

Water was applied via dropper onto the formed composite as well as onto a similar composite that did not include the melamine formaldehyde binder. The results are shown in FIG. 8 in which FIG. 8A is at water addition, FIG. 8B is 30 seconds post water addition, and FIG. 8C is 1 hour post water addition. As can be seen, the sample on the left, which does not include binder, has partially collapsed and the sample on the right, including the binder, has dried and the structure of the sample has not been compromised.

Figure 9:
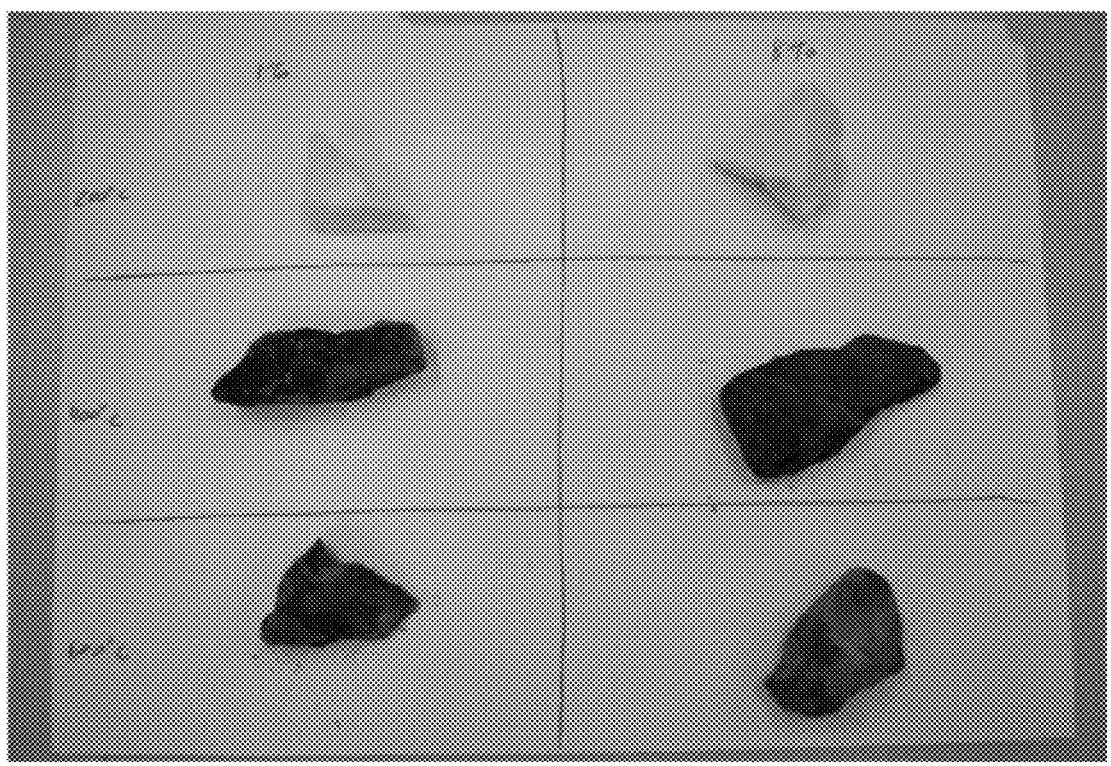
FIG. 9 illustrates nanoclay composites as described herein following pyrolysis.

Nanocomposites including different amounts of the melamine formaldehyde binder (1 wt. % and 8 wt. %) were pyrolyzed in an oven at various temperatures (200° C., 400° C., and 600° C.) for one hour. Results are shown in FIG. 9. As can be seen, the materials survived with no structural collapse.

Example 9

Figure 10:
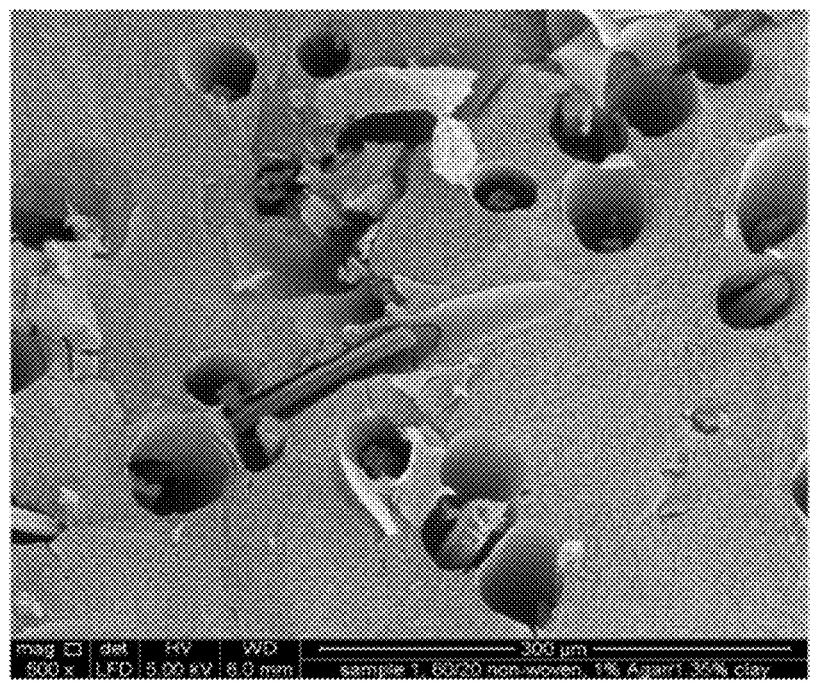
FIG. 10 is an SEM image of a cryo-fractured cross section of a freeze-dried purified nanoclay/agarose gel including fibrous reinforcement.

Agarose powder at 1.0 wt. % was dissolved into an exfoliated and purified nanoclay dispersion as described above. The mixture was then autoclaved to a temperature of 121° C. for 30 min. While it was still hot, the agarose/nanoclay mixture was poured onto a piece of polyethylene terephthalate (PET) non-woven fabric. The fabric/nanoclay mix was then moved into a vacuum oven and pressure was decreased to facilitate the 1% agarose/1.35% clay liquid dispersion to diffuse in and fully penetrate the nonwoven. When cooled, the agarose/nanoclay mixture formed a gel while with PET non-woven fabric inside. This composite was frozen in a −80° C. freezer and then freeze-dried under 10 mTorr (1.3 Pa) pressure for 72 hours. FIG. 10 is an SEM of the cryo-fractured gel. The reinforcement fibers are clearly visible, but do not appear to impact the microcellular structure of the nanocomposite gel.

Example 10

Figure 11A:
FIGS. 11A-11C illustrate the formation of a purified nanoclay/agarose/melamine formaldehyde gel including a polyethylene terephthalate (PET) spacer fabric reinforcement.
Figure 11B:
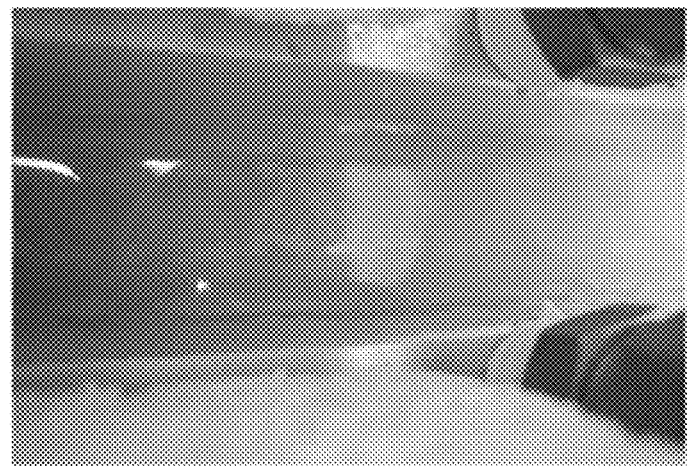
Figure 11C:
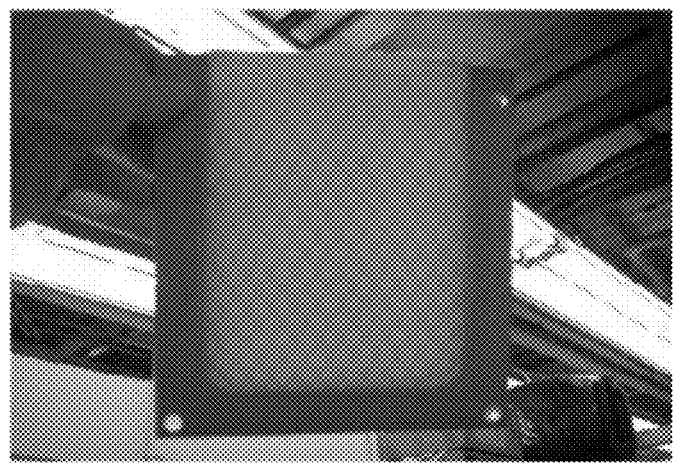
Figure 11D:
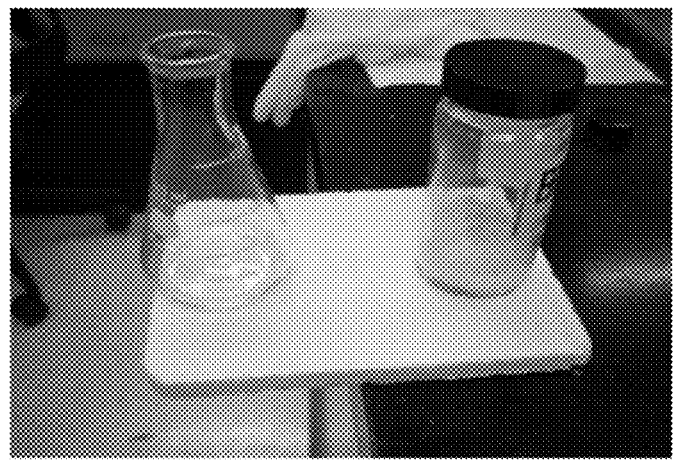
FIG. 11D illustrates the structural integrity and the mechanical strength of the reinforced nanoclay composite of FIGS. 11A-11C.

A 1 cm thick knit polyester spacer fabric with polyester monofilament spacer threads and an open knit construction on both faces was cut to a size to fit into a mold as illustrated in FIG. 11A. A 1 wt. % agarose, 1.13 wt. % purified nanoclay dispersion was heated in an autoclave, and a melamine formaldehyde solution was added to obtain a final concentration of 7.8 wt. % melamine formaldehyde. The mixture was poured into the mold followed by complete immersion of the spacer fabric (FIG. 11B). The liquid mixture was cooled to form a gel, and the temperature of the mold was reduced to below −10° C. by continuous heat exchange with −20° C. glycerol/water coolant. The gel completely froze with the spacer fabric imbedded (FIG. 11C). The frozen sample was freeze-dried to an integrated, strong composite material (FIG. 11D).

Example 11

Figure 12:
FIG. 12 illustrates the flame resistance of a nanoclay composite.

A nanocomposite was formed as described above from a starting aqueous mixture including 0.5 wt. % purified and exfoliated montmorillonite, 0.5 wt. % agarose, and 0.5 wt. % polyvinyl alcohol. Following gelling and freeze-drying, a piece of the nanoclay composite was exposed to the flame from a gas Bunsen burner. The sample is heated to the point of incandesce as shown in FIG. 12, which suggests a temperature of at least 700° C. The sample was subjected to the flame for at least 30 minutes without structural degradation.

While the subject matter has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of the appended claims and any equivalents thereto.

What is claimed is:

1. A method for forming a porous nanocomposite comprising:
    combining a purified nanoclay with a gelator and a liquid to form a mixture including the nanoclay dispersed in the liquid, wherein the mixture includes the gelator in an amount of less than about 5 wt. % by weight of the mixture;
    following combination, gelling the gelator to form a gelled mixture;
    freezing the gelled mixture; and
    freeze-drying the frozen gelled mixture to remove the liquid and form the porous nanocomposite.

2. The method according to claim 1, wherein the liquid is water.

3. The method according to claim 1, wherein the gelator gels according to a noncovalent cross-linking process.

4. The method according to claim 3, wherein the noncovalent cross-linking is through regional physical aggregation of polymers, in which the junction zones are formed by the aggregation of helices or stiff chains or are formed by liquid-liquid phase separation.

5. The method according to claim 4, in which the aggregation or phase separation is due to hydrogen bonding.

6. The method according to claim 4, in which the aggregation or phase separation is thermo-reversible.

7. The method according to claim 1, wherein the gelator is selected from the group consisting of agarose, gelatin, carrageenan, gellan gum, and combinations thereof.

8. The method according to claim 1, wherein the gelator is a small molecule gelator.

9. The method according to claim 1, further comprising adding an ice crystal inhibitor to the mixture.

10. The method according to claim 1, further comprising adding a binder to the mixture.

11. The method according to claim 10, further comprising curing the binder following the step of freeze-drying the mixture.

12. The method according to claim 1, wherein the gelled mixture is frozen according to a cryogenic freezing process.

13. The method according to claim 1, further comprising combining a fibrous reinforcement material with the mixture.

14. The method according to claim 13, wherein the fibrous reinforcement material is a fabric, wherein the mixture penetrates the fabric.

15. The method according to claim 14, wherein the fabric has a front face and a back face that define the volume of the nanocomposite article.

16. A method for forming a porous nanocomposite comprising:
    combining a purified nanoclay with a gelator and a liquid to form a mixture including the nanoclay dispersed in the liquid;
    following combination, gelling the gelator to form a gelled mixture, wherein the gelator gels according to a noncovalent cross-linking process;
    freezing the gelled mixture; and
    freeze-drying the frozen gelled mixture to remove the liquid and form the porous nanocomposite.

17. The method according to claim 16, wherein the noncovalent cross-linking is through regional physical aggregation of polymers, in which the junction zones are formed by the aggregation of helices or stiff chains or are formed by liquid-liquid phase separation.

18. The method according to claim 17, in which the aggregation or phase separation is due to hydrogen bonding.

19. The method according to claim 17, in which the aggregation or phase separation is thermo-reversible.

20. A method for forming a porous nanocomposite comprising:
    combining a purified nanoclay with a gelator and a liquid to form a mixture including the nanoclay dispersed in the liquid, wherein the gelator is a small molecule gelator;
    following combination, gelling the gelator to form a gelled mixture;
    freezing the gelled mixture; and
    freeze-drying the frozen gelled mixture to remove the liquid and form the porous nanocomposite.

* * * * *